March 8, 1966 N. O. ROSAEN 3,239,062
REMOVABLE FILTER ASSEMBLY
Filed Oct. 15, 1962 2 Sheets-Sheet 2
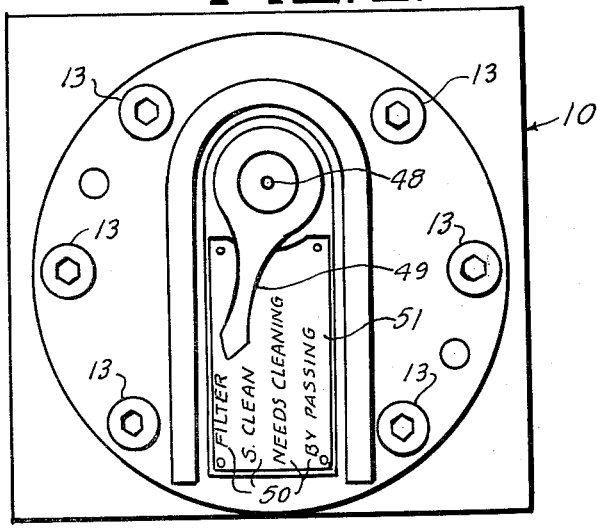
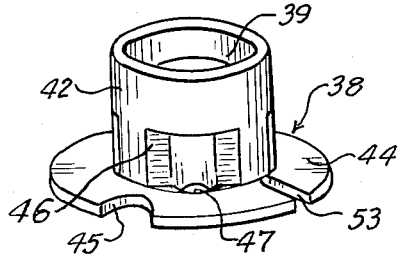
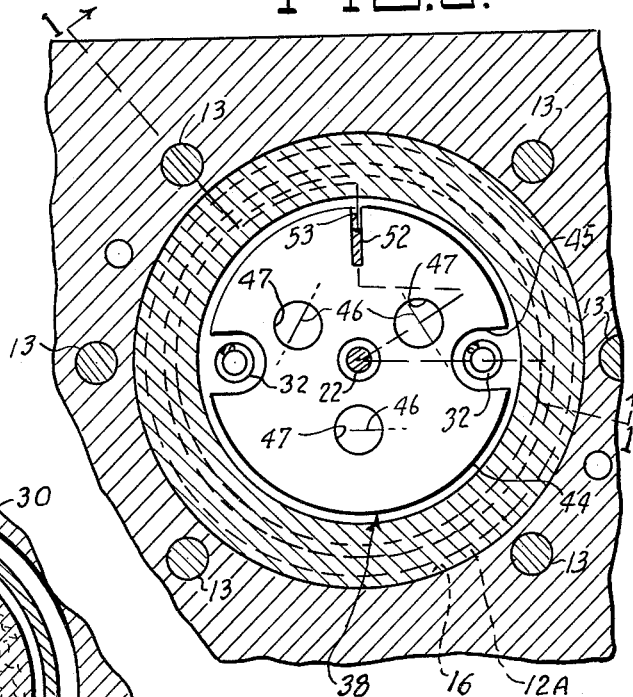
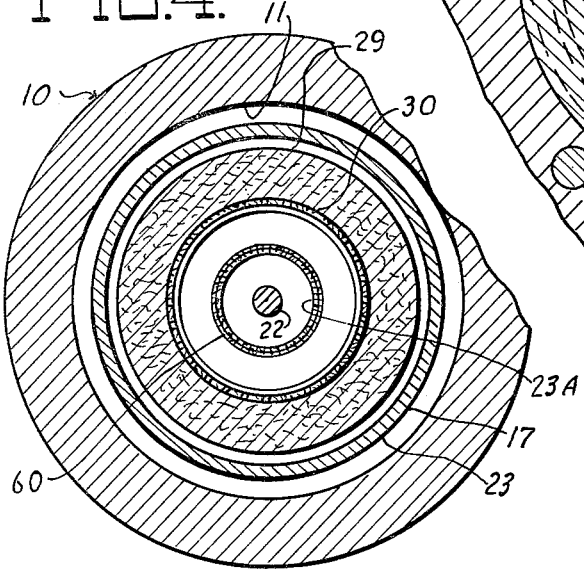
INVENTOR.
NILS O. ROSAEN
BY
*Hauke & Hauke*
ATTORNEYS 3,239,062
REMOVABLE FILTER ASSEMBLY
Nils O. Rosaen, Bloomfield Hills, Mich., assignor to The Rosaen Filter Company, Hazel Park, Mich., a corporation of Michigan
Filed Oct. 15, 1962, Ser. No. 230,473
8 Claims. (Cl. 210—90)

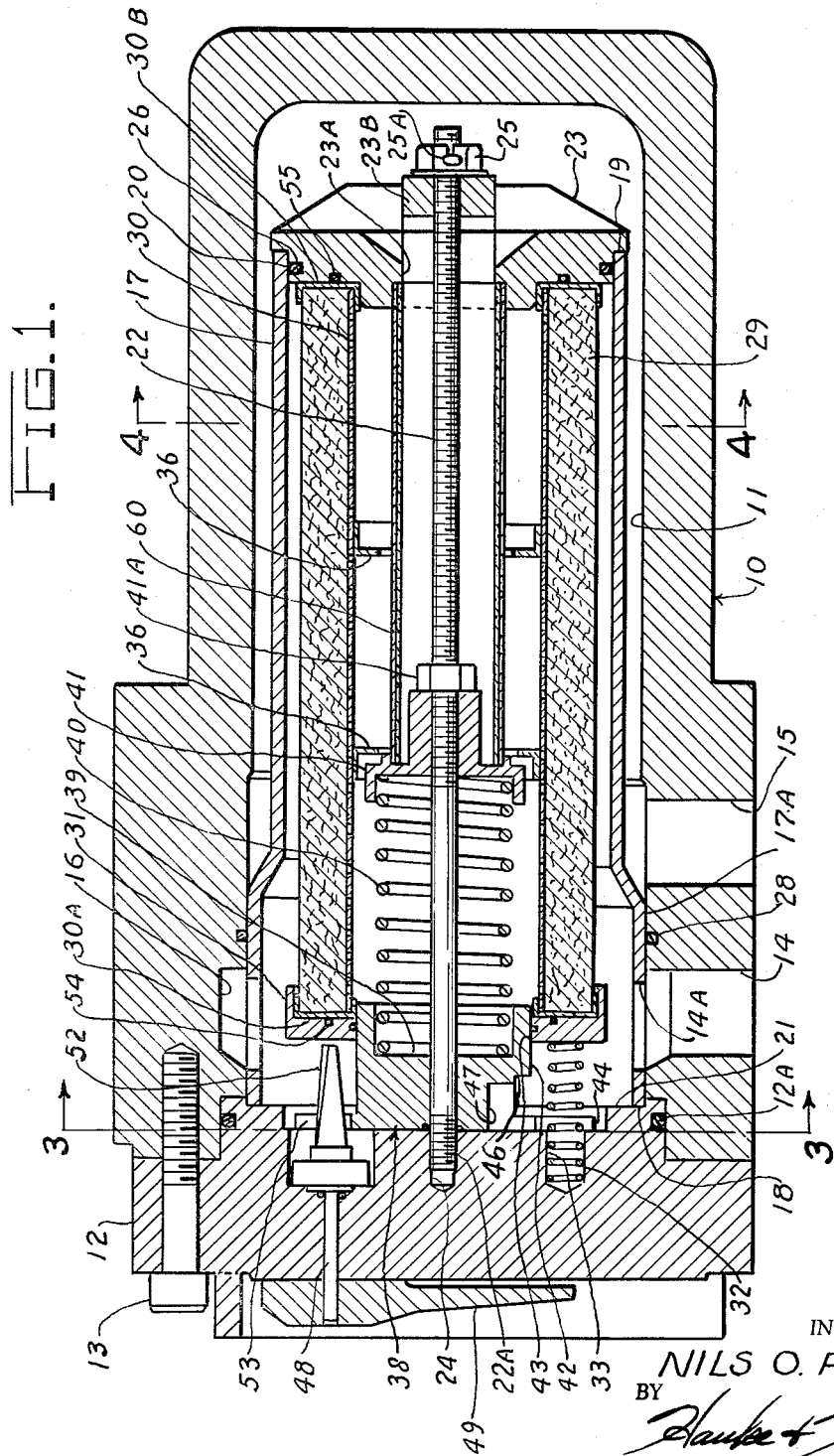

The present invention relates to fluid filter devices and mor particularly to such a device constructed to provide for easy removal and replacement or cleaning of the filter element when it has become clogged.

The filter element of a fluid filter device will eventually become clogged and will require removal from its housing either to clean the element or to replace it. In the filter devices heretofore provided, some of the foreign matter caught by the filter element tends to remain in the housing, and this must be cleaned out before putting the device back into operation.

It is an object of the present invention to facilitate the replacement or cleaning of filter elements by providing a double housing fluid filter device constructed so that foreign matter clogging the element is trapped by the inner housing and removed with the filter element.

Another object of the present invention is to improve fluid filtering devices by providing simplified means for indicating the clogged condition of the filter element.

Still another object of the present invention is to increase the operating time of fluid filtering devices by providing an improved bypass means operable to open a fluid path directly from the inlet to the outlet side of the filter element.

A further object of the invention is to improve filtering devices by providing a readily disassembled and reassembled construction retained against inadvertent loosening of internal components.

Still further objects and advantages will readily occur to one skilled in the art to which the invention pertains upon reference to the following drawings in which like reference characters refer to like parts throughout the several views and in which:

FIG. 1 is a longitudinal cross sectional view of a preferred embodiment of the present invention and taken substantially on the line 1—1 of FIG. 3 to illustrate parts in displaced position.

FIG. 2 is an elevational end view of the preferred filter device shown in FIG. 1 as seen from the left end of FIG. 1.

FIG. 3 is a cross sectional view taken substantially on the line 3—3 of FIG. 1.

FIG. 4 is a cross sectional view taken substantially on the line 4—4 of FIG. 1.

FIG. 5 is a perspective view of the valve element utilized in the assembly.

Now referring to the drawings for a more detailed description of the present invention, a preferred filter device is shown as comprising an outer housing member 10 provided with a substantially cylindrical chamber 11. A cap member 12 is secured to the outer housing 10 by any means such as screws 13 and closes one end of the chamber 11. The outer housing 10 is provided with an inlet 14, an outlet 15 and an inner annular groove 16 communicating with the inlet 14. Leakage past the cap 12 is prevented by an O-ring seal 12A.

An inner housing member 17, having an annular end edge 18 bearing on an annular seat 21 in the cap member 12, is carried in the chamber 11 by means of a rod 22 and a retaining member 23. The rod 22 has a threaded end 22A carried in a threaded bore 24 provided in the cap member 12 and extends axially through the chamber 11. A castellated nut 25, with a cotter pin 25A, is provided on the free threaded end of the rod 22 and clamps the retaining member 23 against the other annular end edge 19 of the inner housing 17 to bring the housing 17 into retaining engagement with the seat 21. An O-ring seal 20 is provided in an annular groove 26 formed in the retaining member 23 as shown to prevent fluid leakage from the interior of the inner housing 17 past the retaining member 23. A plurality of annularly spaced perforations 14A in the inner housing 17 communicate with the groove 16. The outer housing 10 is provided with an O-ring seal 28 which engages an enlarged portion 17A of the inner housing 17 and prevents fluid leakage into the annular space between the outer housing 10 and the smaller portion of the inner housing 17.

A cylindrical filter element 29, provided with an inner perforated back-up cylinder 30 having end flanges 30A and 30B, is carried in the inner housing 17 substantially coaxially with respect to the rod 22. One end flange 30B is seated against the retaining member 23 and the other end flange 30A is seated in a retainer cup 31. A pair of spring members 32 are seated at one end in recesses 33 provided in the cap member 12 and the other end is compressed against the outer side of the retainer cup 31. The spring members 32 thus clamp the filter element 29 between the retainer cup 31 and the member 23. Perforated spacers 36 inside the cylinder 30 retain the filter element 29 substantially concentric to the rod 22. The retaining member 23 has a central opening 23A and a transverse bridge 23B to permit fluid flow from the interior of the filter element 29 through the space between the housings to the outlet 15.

A valve member 38 is axially slidably carried on the rod 22. The valve member 38 is provided with a cylindrical recess 39 which forms the seat for a spring member 40, and a seat member 41 is threaded on the rod 22 at an intermediate position to provide the seat for the other end of the spring member 40. The seat member 41 is adjustable to vary the compression of the spring member 40 and is locked in place by means of a jam nut 41A. The valve member 38 is provided with an annular surface 42 which slidingly engages an inner annular surface 43 of the annular retainer cup 31. The valve member 38 is provided with a radially extending flange 44 facing the inner surface of the cap member 12 and urged against it by the spring member 40. The flange 44 is provided with annularly spaced slots 45 through which the spring members 32 extend. As can best be seen in FIG. 3, the valve member 38 is preferably provided with a plurality of annularly spaced grooves 46 and a plurality of annularly spaced perforations 47 communicating therewith and with the outer face of the valve which faces the inner side of the cap member 12.

O-ring seals 54 and 55 are provided between the end flange 30A and the retainer cup 31 and between the end flange 30B and the retaining member 23 respectively. It is to be noted that the O-ring seals 54–55 are each axially aligned with the rod 22 and are of equal diameter so that the pressures on each end of the filter element 29 are effectively balanced.

A shaft member 48 is rotatably carried in the cap member 12. A pointer element 49 is secured to the pin member 48 and points to indica 50 provided on an indicator plate 51. An actuator member 52 is carried on the interior end of the pin member 48 and extends through a rectangular slot 53 provided in the flange 44. The actuator member 52 preferably comprises an elongated strip having a substantially uniform twist about its longitudinal axis from end to end. As the valve member 38 moves axially, the twist of the actuator member 52 in combination with the slot 53 produces a rotation of the pin member 48 and the pointer element 49.

A second filter element 60 is carried between the member 41 and the retainer member 23, primarily to trap particles loosened from the inner surfaces of the primary filter 29 which is preferably made of paper. This eliminates the necessity for pre-conditioning the filter 29.

In operation, fluid enters the inlet 14, fills the groove 16 and passes through the perforations 14A and into the interior of the inner housing 17 to the inlet side of the filter element 29. The fluid then passes through the filter elements 29 and 60, through the central opening 23A in the retaining member 23 into the space between the housings 10 and 17, and out the outlet 15.

As the filter element 29 becomes clogged, a pressure differential is created across the valve member 38 since this member is carried intermediate the inlet and outlet side of the filter element 29. The increase in pressure differential produces a corresponding axial movement of the valve member 38 against the pressure of the spring member 40. The grooves 46 and the perforations 47 increase the surface of the valve member 38 exposed to the inlet side of the filter element 29 and thereby facilitate movement in response to changes in pressure differential across the valve member 38. Axial movement of the valve member 38 produces a corresponding rotational movement of the pointer element 49 and thus the indicator plate 51 can be provided with the desired indicia 50 which indicates the condition of the filter element 29.

As the clogging increases and before the filter element 29 is in danger of rupturing, the valve member 38 will have moved sufficiently away from the cap member 12 so that the grooves 46 are in communication with the inner side of the filter element 29. Thus a bypass fluid route is opened between the inlet 14 and the outlet 15. It will be noted that the bypass route does not pass through or in contact with the foreign matter which has previously been filtered from the fluid. This foreign matter is trapped inside the inner housing member 17.

When it is necessary to remove the filter element 29 for replacing or cleaning it, the cap member 12 is removed by removing the screws 13. The entire inner structure of the filter device is secured to the cap member 12 by the rod 22 and nut 25 and will be removed with it. It is apparent that foreign matter which has been filtered from the fluid and collected between the inner housing 17 and the filter element 29 will be removed with the housing 17. Since substantially no foreign matter will be left in the chamber 11, this need not be cleaned before replacing the cap member 12.

The described construction permits the filter element to be cleaned or replaced with little loss of time since the unit comprised of the cap member, inner housing and filter element may be quickly removed and replaced with a clean or new unit and immediately returned to operation.

It will be noted also that the cup member 31 carrying the outer end of the filter member 29 is normally positioned radially inwardly of the ports 14A so as to form a baffle for the entering fluid from the ports 14A and prevent the force of fluid from directly impinging on the filter element 29 which otherwise may be damaged.

Although I have described but one embodiment of the present invention, it is apparent that many changes and modifications can be made without departing from the spirit of the invention or the scope of the appended claims.

I claim:
1. A filter device comprising
    (a) an outer housing having an inlet and an outlet,
    (b) said outer housing having a substantially cylindrical chamber,
    (c) a cap member removably secured to said outer housing and closing one end of said chamber,
    (d) a rod carried by said cap member extending into and axially aligned with said chamber,
    (e) an inner housing carried by said rod in said chamber and being spaced from said outer housing along a portion of the length thereof to define an outlet chamber therebetween,
    (f) said outer housing being provided with an inner peripheral groove sealed from said outlet chamber and said inner housing being provided with a plurality of perforations providing communication between said peripheral groove and the interior of said inner housing,
    (g) a filter element carried in said inner housing in axial alignment with said rod,
    (h) a plurality of outlet perforations being provided in said inner housing providing communication between the outlet side of said filter element and said outlet chamber,
    (i) said outlet in said outer housing being in communication with said outlet chamber,
    (j) an annular member axially slidably carried on said rod,
    (k) resilient means urging said annular member to abut said cap member,
    (l) said annular member being provided with pressure responsive means operable to move said annular member away from said cap member upon an increase in pressure differential across said filter element, and
    (m) indicator means operably connected to said annular member and being operable to indicate the axial position of said annular member.
2. The device as defined in claim 1 and in which said pressure responsive means comprises
    (a) a plurality of annularly spaced peripheral grooves being provided on the surface of said annular member which normally engages said cap member,
    (b) said grooves being in communication with the inlet side of said filter element,
    (c) a plurality of annularly spaced perforations communicating with said grooves, and
    (d) said annular member being provided with a surface portion exposed to the outlet side of said filter element.
3. A filter device comprising
    (a) an outer housing having an inlet and an outlet,
    (b) said housing having a chamber,
    (c) a cap member removably secured to said outer housing and closing one end of said chamber,
    (d) an inner housing secured to said cap member and extending into said chamber to define a substantially annular outlet chamber intermediate said inner housing and said outer housing,
    (e) a filter element secured to said cap member and extending into said inner housing to define a substantially annular inlet chamber intermediate said inner housing and said filter element,
    (f) said inner housing having inlet means connecting said inlet with said inlet chamber and outlet means connecting the outlet side of said filter element with said outlet chamber,
    (g) said outlet being connected with said outlet chamber,
    (h) said inlet chamber being completely enclosed on all sides, excepting at said inlet means, by said filter element and said inner housing,
    (i) said cap member, said inner housing and said filter element being secured together such that upon removal of said cap member from said outer housing, said inner housing and filter element are removed as a unit from the interior of said outer housing,
    (j) an annular flanged member axially slidably carried in said inlet chamber and being operable to move axially upon changes in pressure differential across said filter element,
    (k) resilient means urging said flanged member to abut against said cap member, and

(l) means carried by said cap member operably connected to said flanged member and being operable to indicate the axial position of said flanged member.

4. The filter device as defined in claim 3 and including means operable to open a fluid path bypassing said filter element when said flanged member reaches a predetermined axial position.

5. A filter device comprising
   (a) an outer housing having an inlet and an outlet,
   (b) said outer housing having a substantially cylindrical chamber,
   (c) a cap member removably secured to said outer housing and closing one end of said chamber and a rod carried by said cap member extending into and axially aligned with said chamber,
   (d) a filter element secured to said cap member and extending into said chamber,
   (e) an inner housing member carried by said cap member and enclosing said filter element,
   (f) said inner housing member being spaced from said filter element to define an inlet chamber,
   (g) inlet means connecting said inlet with said inlet chamber whereby fluid is directed through said inlet, said inlet means, and through said filter element,
   (h) outlet means provided in said inner housing connecting the outlet side of said filter element with said outlet,
   (i) said inlet chamber being completely enclosed on all sides, excepting at said inlet means, by said filter element and said inner housing,
   (j) said cap member, said inner housing and said filter element being secured together such that upon removal of said cap member from said outer housing, said inner housing and said filter element are removed with said cap member as a unit from the interior of said outer housing,
   (k) an annular member axially slidably carried on said rod,
   (l) resilient means urging said annular member to abut said cap member,
   (m) said annular member being provided with pressure responsive means operable to move said annular member away from said cap member upon an increase in pressure differential across said filter element, and
   (n) indicator means operably connected to said annular member and being operable to indicate the axial position of said annular member.

6. A filter device comprising
   (a) an outer housing having an inlet and an outlet,
   (b) said housing having a chamber,
   (c) a cap member and a first means removably securing said cap member to said outer housing to close one end of said chamber,
   (d) an inner housing and a second means securing said inner housing to said cap member to extend into said chamber to define a substantially annular outlet chamber intermediate said inner housing and said outer housing,
   (e) a filter element secured to said cap member by said second means and extending into said inner housing to define a substantially annular inlet chamber intermediate said inner housing and said filter element,
   (f) said inner housing having inlet means connecting said inlet with said inlet chamber and outlet means connecting the outlet side of said filter element with said outlet chamber,
   (g) said outlet being connected with said outlet chamber,
   (h) said inlet chamber being completely enclosed on all sides, excepting at said inlet means, by said filter element and said inner housing, and
   (i) said cap member, said inner housing and said filter element being secured together by said second means such that upon removing of said first means to release said cap member from said outer housing, said cap member, said filter element and said inner housing will be removed as a unit from said outer housing.

7. A filter device comprising
   (a) an outer housing having an inlet and an outlet,
   (b) said outer housing having a substantially cylindrical chamber,
   (c) a cap member and a first means removably securing said cap member to said outer housing to close one end of said chamber,
   (d) a filter element and a second means securing said filter element to said cap member to extend into said chamber,
   (e) an inner housing member secured to said cap member by said second means and extending into said chamber to enclose said filter element,
   (f) said inner housing being spaced from said filter element to define an inlet chamber,
   (g) inlet means connecting said inlet with said inlet chamber whereby fluid is directed through said inlet, said inlet means and through said filter element,
   (h) outlet means provided in said inner housing connecting the outlet side of said filter element with said outlet,
   (i) said inlet chamber being completely enclosed on all sides, excepting at said inlet means, by said filter element and said inner housing, and
   (j) said cap member, said inner housing and said filter element being secured together by said second means such that upon removing of said first means to release said cap member from said outer housing, said cap member, said filter element and said inner housing will be removed as a unit from said outer housing.

8. A filter device comprising
   (a) an outer housing having an inlet and an outlet,
   (b) said outer housing having a substantially cylindrical chamber,
   (c) a cap member and a first means removably securing said cap member to said outer housing to close one end of said chamber,
   (d) an inner housing and a second means securing said inner housing to said cap member to extend into said chamber, said second means comprising a rod carried by said cap member and extending axially into said chamber,
   (e) said inner housing being carried by said rod in a position spaced from said outer housing along a portion of the length thereof to define an outlet chamber therebetween,
   (f) said outer housing being provided with an inner peripheral groove sealed from said outlet chamber and connected with said inlet and said inner housing being provided with a plurality of perforations providing communication between said peripheral groove and the interior of said inner housing,
   (g) a filter element secured to said cap member by said second means and carried in said inner housing in axial alignment with said rod,
   (h) a plurality of outlet perforations being provided in said inner housing providing communication between the outlet side of said filter element and said outlet chamber,
   (i) said outlet in said outer housing being in communication with said outlet chamber, and
   (j) said cap member, said inner housing and said filter element being secured together by said second means such that upon removing of said first means to release said cap member from said outer housing, said cap member, said filter element and said inner housing will be removed as a unit from said outer housing.

(References on following page)

References Cited by the Examiner

UNITED STATES PATENTS

| | | | |
|---|---|---|---|
| 1,280,015 | 9/1918 | Goodwin | 23—320 X |
| 1,290,814 | 1/1919 | Weaver | 73—320 X |
| 1,654,615 | 1/1928 | Smith | 210—443 X |
| 1,664,558 | 3/1928 | Hastings | 73—320 |
| 2,303,011 | 11/1942 | Weber | 137—553 |
| 2,354,645 | 8/1944 | Bateman | 210—130 |
| 2,400,201 | 5/1946 | Katcher | 210—90 |
| 2,639,118 | 5/1953 | Stott | 137—553 X |
| 2,646,885 | 7/1953 | James | 210—90 |
| 2,879,892 | 3/1959 | Frakes | 210—90 |
| 2,911,100 | 11/1959 | Brunsman | 210—457 |
| 2,983,384 | 5/1961 | Winslow. | |
| 3,021,955 | 2/1962 | Joyce | 210—458 |
| 3,053,389 | 9/1962 | Rosaen | 210—90 |
| 3,061,101 | 10/1962 | Humbert | 210—457 |
| 3,080,058 | 3/1963 | Rosaen | 210—90 |
| 3,080,973 | 3/1963 | Burchlatter | 210—43 |
| 3,083,832 | 4/1963 | Hathoway | 210—457 |

SAMIH N. ZAHARNA, *Primary Examiner.*

REUBEN FRIEDMAN, HERBERT L. MARTIN,
*Examiners.*

R. HALPER, *Assistant Examiner.*